US012738688B2

(12) United States Patent
Campbell et al.

(10) Patent No.: US 12,738,688 B2

(45) Date of Patent: Sep. 15, 2026

(54) ELECTRICAL CONNECTOR WITH ERGONOMIC AXIAL MATING ASSIST DEVICE

(71) Applicant: Aptiv Technologies AG, Schaffhausen (CH)

(72) Inventors: Jeffrey S. Campbell, West Bloomfield, MI (US); Wesley W. Weber, Jr., Lapeer, MI (US)

(73) Assignee: Aptiv Technologies AG, Schaffhausen (CH)

( * ) Notice: Subject to any disclaimer, the term of this patent is extended or adjusted under 35 U.S.C. 154(b) by 335 days.

(21) Appl. No.: 18/597,089

(22) Filed: Mar. 6, 2024

(65) Prior Publication Data

US 2024/0305042 A1 Sep. 12, 2024

Related U.S. Application Data

(60) Provisional application No. 63/458,713, filed on Apr. 12, 2023, provisional application No. 63/450,467, filed on Mar. 7, 2023.

(51) Int. Cl.

*H01R 13/506* (2006.01)
*H01R 13/508* (2006.01)
(Continued)

(52) U.S. Cl.

CPC ..... *H01R 13/62927* (2013.01); *H01R 13/506* (2013.01); *H01R 13/508* (2013.01);
(Continued)

(58) Field of Classification Search

None
See application file for complete search history.

(56) References Cited

U.S. PATENT DOCUMENTS

| | | | |
|---|---|---|---|
| 6,120,308 | A | 9/2000 | Hayashi |
| 6,186,827 | B1 | 2/2001 | Okabe |

(Continued)

FOREIGN PATENT DOCUMENTS

| | | | | |
|---|---|---|---|---|
| EP | 1180826 | A1 * | 2/2002 | ....... H01R 13/62972 |
| EP | 0793304 | B1 | 4/2004 | |
| JP | 5884711 | B2 | 2/2016 | |

OTHER PUBLICATIONS

"Extended European Search Report"; European Patent Office; Mailed on Jun. 30, 2024; 8 Pages.

*Primary Examiner* — Tho D Ta

(74) *Attorney, Agent, or Firm* — Billion & Armitage

(57) ABSTRACT

A connector system may include a connector having a connector housing. A connector system may include a cam member rotatably attached to the connector housing, wherein the cam member defines an engaging lug extending along an axis substantially parallel to an axis of rotation of the cam member. A connector system may include a user moveable member slidably attached to the connector housing. The user moveable member defines a first cam slot in which the engaging lug is received. The first cam slot is shaped such that the cam member is rotated by movement of the engaging lug through the first cam slot as the user moveable member is moved longitudinally relative to the connector housing. Methods of operating and assembling a connector system are also provided.

17 Claims, 11 Drawing Sheets

(51) Int. Cl.

| | |
|---|---|
| ***H01R 13/58*** | (2006.01) |
| ***H01R 13/629*** | (2006.01) |
| ***H01R 43/20*** | (2006.01) |

(52) U.S. Cl.

CPC ......... *H01R 13/5812* (2013.01); *H01R 43/20* (2013.01); *H01R 2201/26* (2013.01)

(56) References Cited

U.S. PATENT DOCUMENTS

| | | | | |
|---|---|---|---|---|
| 6,565,372 | B2 * | 5/2003 | Bakker .............. | H01R 13/4538 439/157 |
| 7,462,047 | B2 | 12/2008 | Tyler | |
| 7,744,390 | B2 | 6/2010 | Tyler et al. | |
| 8,192,212 | B2 | 6/2012 | Casses et al. | |
| 9,912,101 | B1 | 3/2018 | Campbell et al. | |
| 9,917,402 | B1 | 3/2018 | Campbell et al. | |
| 10,290,970 | B1 | 5/2019 | Weber et al. | |
| 2024/0380161 | A1 * | 11/2024 | Campbell ........ | H01R 13/62955 |

* cited by examiner

ELECTRICAL CONNECTOR WITH ERGONOMIC AXIAL MATING ASSIST DEVICE

CROSS-REFERENCE TO RELATED APPLICATIONS

This application claims the benefit of and priority to U.S. Provisional Application 63/450,467, titled "Electrical Connector with Ergonomic Axial Mating Assist Device", filed Mar. 7, 2023, and further claims the benefit of and priority to U.S. Provisional Application 63/458,713, titled "Electrical Connector with Ergonomic Axial Mating Assist Device", filed Apr. 12, 2023, the contents of each of which are incorporated by reference herein.

TECHNICAL FIELD

This disclosure is directed to an electrical connector with an ergonomic axial mating assist device that provides for a reduced packaging size.

BACKGROUND

As vehicle electrical content increased, manufacturers desired to reduce the overall number of connection systems per vehicle, this led to a higher number of input/output (I/O) connections per system. Because these higher I/O connector systems have higher mating forces, hand-mating was undesirable. Instead, connector systems were often drawn together using bolts or special tools. Over time, bolted connections were replaced by an integral lever mating system for reducing mating forces to an ergonomically acceptable limit. These lever mating systems required pre-positioning the connector prior to closing the lever assist mechanism. Due to the cumbersome nature of this multi-step mating process, these connection systems were not ergonomically friendly and were also prone to improper mating and mating damage. Other ergonomic connector mating systems, such as those disclosed in U.S. Pat. Nos. 7,462,047, 7,744,390, 8,192,212, 9,912,101, 9,917,402, and 10,290,970 have used an axial slide and a gear rack to rotate a cam member to thereby draw two electrical connectors together. However, use of these ergonomic connector mating systems may be limited by the space required to provide the required travel of the axial slide to fully mate the connectors.

SUMMARY

In some aspects, the techniques described herein relate to a connector system, including: a connector having a connector housing; a cam member rotatably attached to the connector housing, wherein the cam member defines an engaging lug extending along an axis substantially parallel to an axis of rotation of the cam member; and a user moveable member slidably attached to the connector housing, wherein the user moveable member defines a first cam slot in which the engaging lug is received and wherein the first cam slot is shaped such that the cam member is rotated by movement of the engaging lug through the first cam slot as the user moveable member is moved longitudinally relative to the connector housing.

In some aspects, the techniques described herein relate to a method of operating a connector system, including: providing a first connector having a connector housing and a cam member rotatably attached to the connector housing, wherein the cam member defines an engaging lug extending along an axis substantially parallel to an axis of rotation of the cam member, and a user moveable member slidably attached to the connector housing, wherein the user moveable member defines a first cam slot in which the engaging lug is received; inserting a camming post of a second connector within the cam member; moving the user moveable member relative to the connector housing, thereby rotating the cam member by moving the engaging lug along the first cam slot; and drawing the first and second connectors together by movement of a camming post of the second connector along a second cam slot defined by the cam member due to the rotation of the cam member.

In some aspects, the techniques described herein relate to a method of assembling a connector system, including: rotatably attaching a cam member defining an engaging lug to a connector housing, wherein the engaging post extends along an axis substantially parallel to an axis of rotation of the cam member; slidably attaching a user moveable member defining a first cam slot to the connector housing; and inserting the engaging lug within the first cam slot, wherein the first cam slot is shaped such that the cam member is rotated by movement of the engaging lug through the first cam slot as the user moveable member is moved longitudinally relative to the connector housing.

BRIEF DESCRIPTION OF THE DRAWINGS

Embodiments of the present invention will now be described by way of example with reference to the accompanying drawings, in which.

DETAILED DESCRIPTION

In contrast to prior ergonomic axial mating assist devices, the electrical connector presented herein does not use a gear rack to rotate the cam member as was done in those prior ergonomic axial mating assist devices. Instead, pin and channel features engage the axial slider with the rotating mate assist cam. The channel shape may be contoured to optimize the ergonomic force feedback to the assembly operator mating the connector. This arrangement reduces the forward slider travel, compared to previous gear rack driven connector systems and enables the use of more compact short length device headers, which are desirable for space savings, especially in automotive vehicle packaging. This connector presented herein also includes several other features that provide low part cost and low cost assembly methods.

Figure 1:
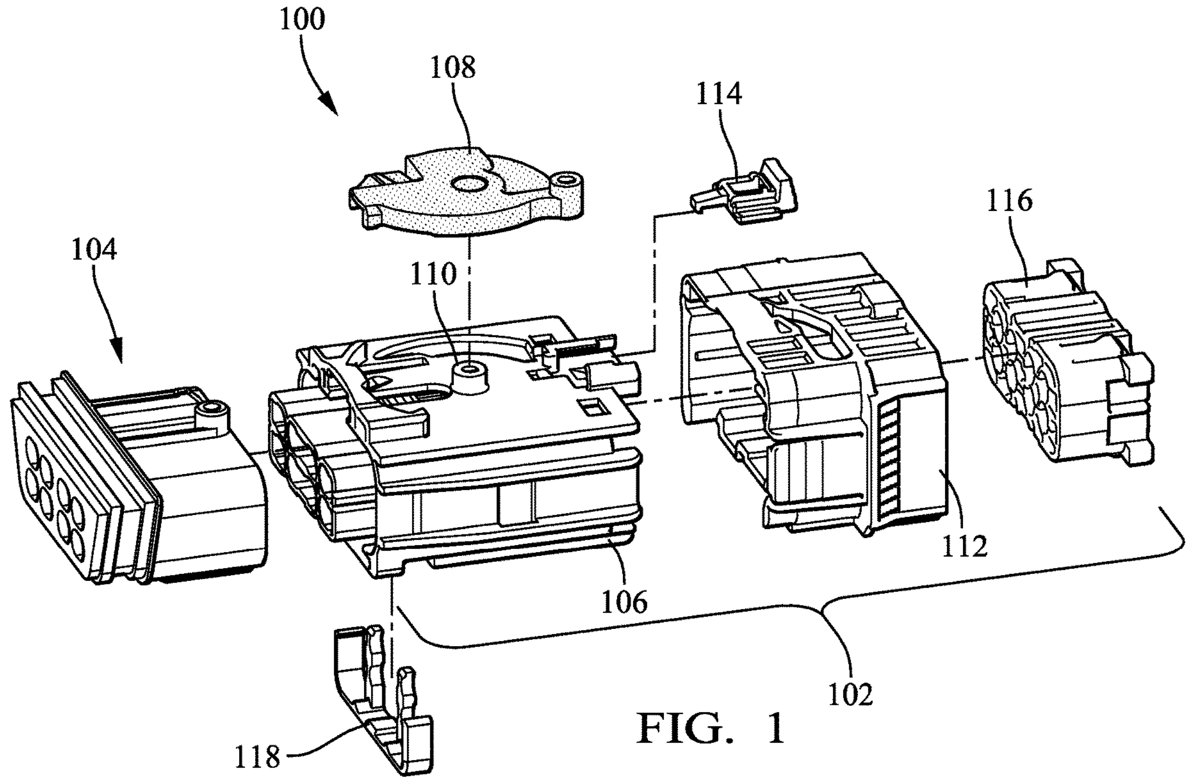
FIG. 1 shows an exploded view of a connector and a corresponding mating connector according to some embodiments.

A non-limiting example of a connector system 100, in this example an electrical connector system, is shown in FIG. 1. The connector system 100 includes a first connector 102 and a corresponding mating second connector 104. The first connector 102 includes a connector housing 106 and a cam member 108 which is rotatably attached to the connector housing 106 by a pivot 110. The first connector 102 also includes a user moveable member, hereafter referred to as the slide 112, which is slidably attached to the connector housing 106 and is sized and shaped to be mounted over the connector housing 106 and to surround the connector housing 106. Movement of the slide 112 along a longitudinal axis X (shown in FIG. 2) of the connector housing 106 causes the cam member 108 to rotate around the pivot 110 which assists in mating and unmating the first and second connectors 102, 104 as will be explained in detail below. The first connector 102 further includes a connector position assurance (CPA) device 114 that is configured to retain the first connector 102 to the second connector 104 once they are fully mated. The first connector 102 also includes a cable strain relief device 116 which is configured to snap over wire electrical cables 202 (see FIG. 2) that are attached to electrical terminals (not shown) within the connector housing 106 and a secondary terminal locking feature 118 which inhibits primary terminal locking features 904 (see FIGS. 9 and 10) from inadvertently releasing electrical terminals attached to the wire electrical cables 202.

Figure 2:
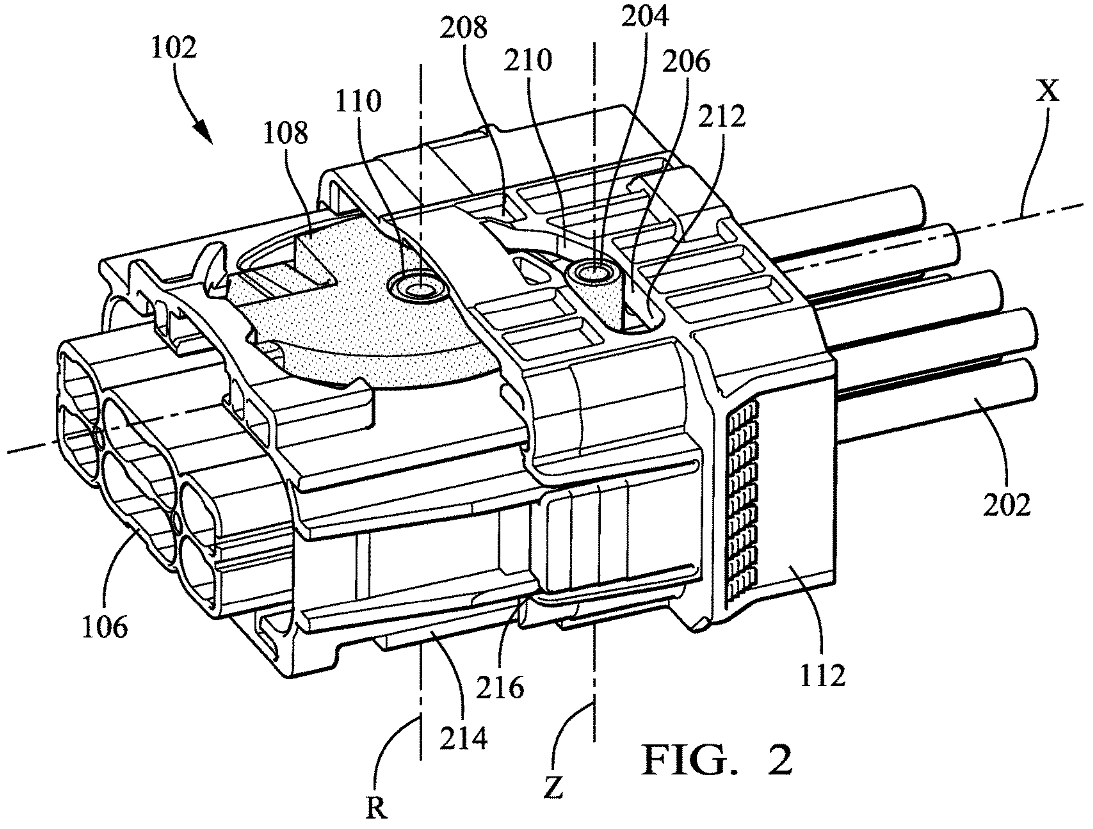
FIG. 2 shows an isometric view of a connector according to some embodiments.

As illustrated in FIG. 2, the cam member 108 has an engaging lug 204 in the form of a post that extends along a vertical axis Z that is substantially parallel to an axis of rotation R of the cam member 108 around the pivot 110. The slide 112 defines a curved first cam slot 206 in which the engaging lug 204 defined by the cam member 108 is received. The first cam slot 206 has a substantially straight entrance portion 208 that is generally parallel to the longitudinal axis X, a curved camming portion 210, and a substantially straight end portion 212 that is generally perpendicular to the longitudinal axis X. Additionally, the connector housing 106 defines rails 214 that are received within slots 216 in the slide 112. The rails 214 and the slots 216 are configured to cooperate with one another to cause the slide 112 to move relative to the connector housing in a substantially straight path along the X axis.

Figure 3:
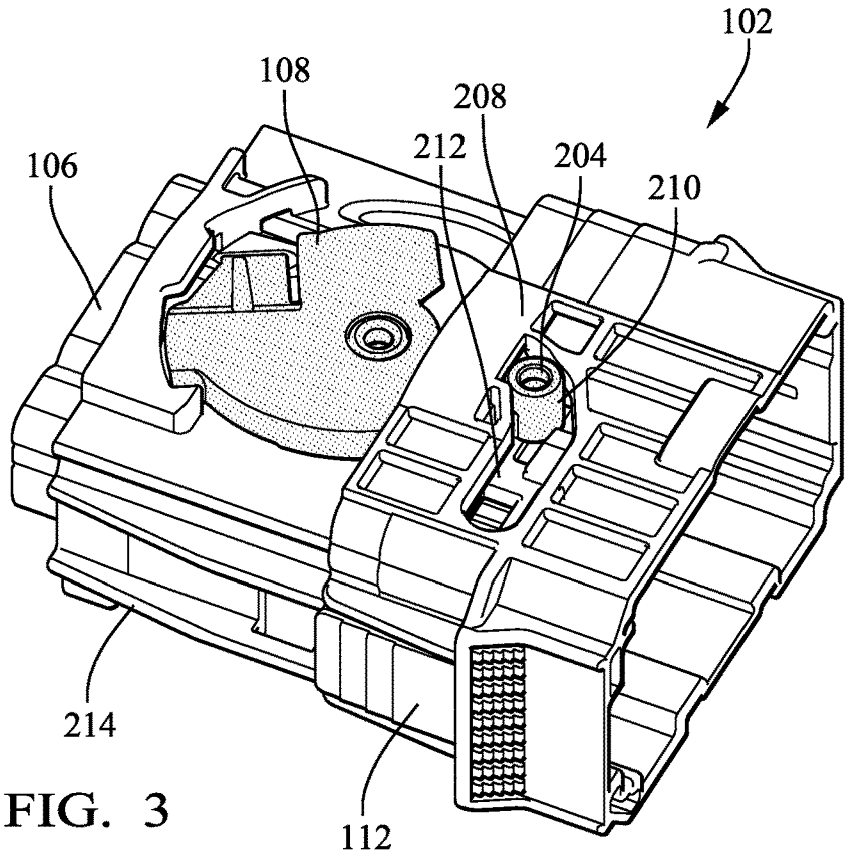
FIGS. 3 and 4 show the movement of the engaging lug within the first cam slot as the user moveable member moves relative to the connector housing according to some embodiments.
Figure 4:
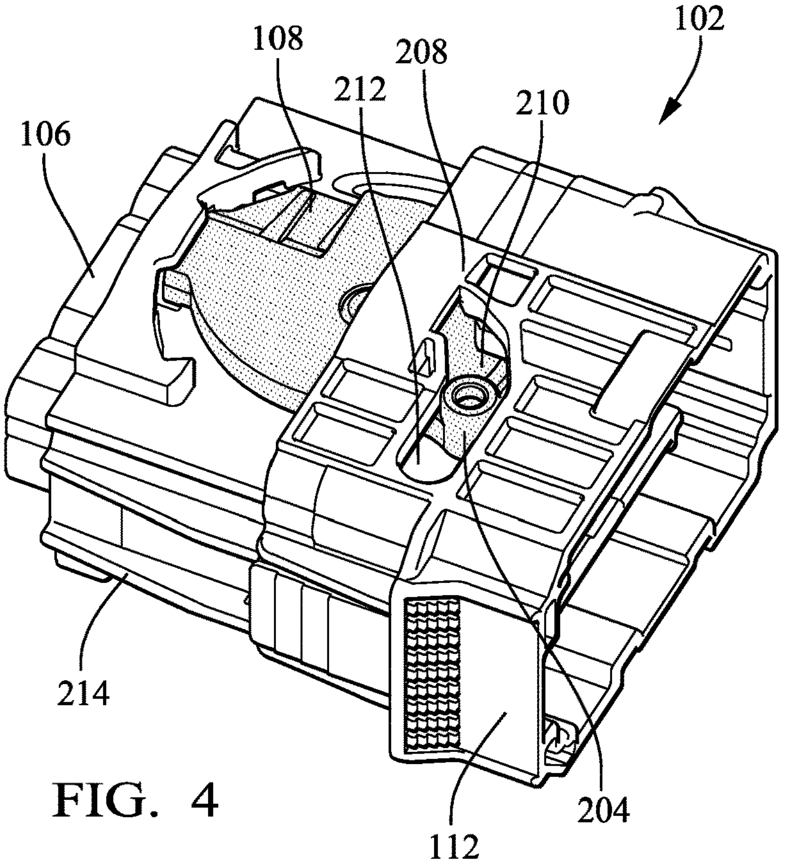

FIGS. 3 and 4 show the movement of the engaging lug 204 within the first cam slot 206 as the slide 112 moves relative to the connector housing 106. The cam member 108 is rotated by movement of the engaging lug 204 through the first cam slot 206 as the slide 112 is moved longitudinally relative to the connector housing 106.

Figure 5:
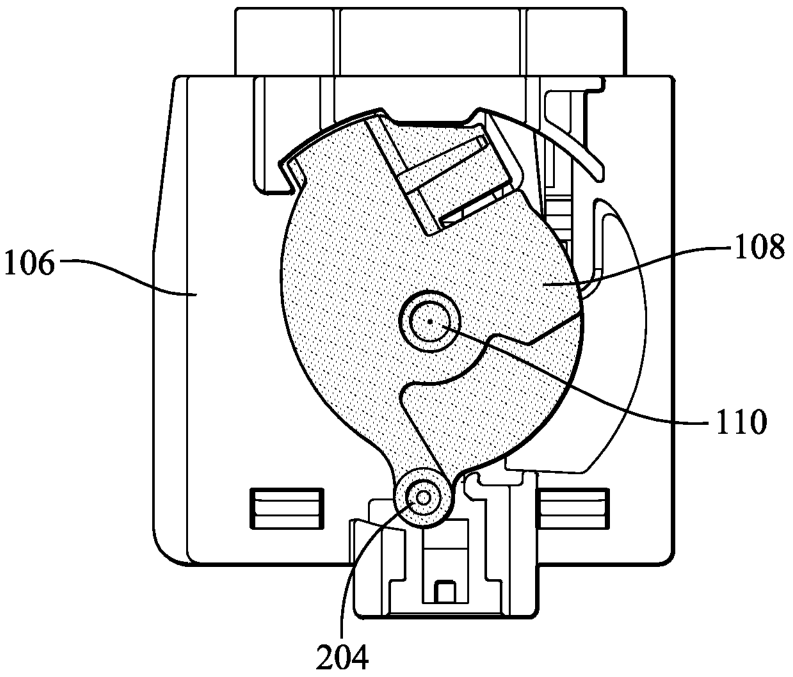
FIG. 5 shows a top view of a subassembly of the connector according to some embodiments.
Figure 6:
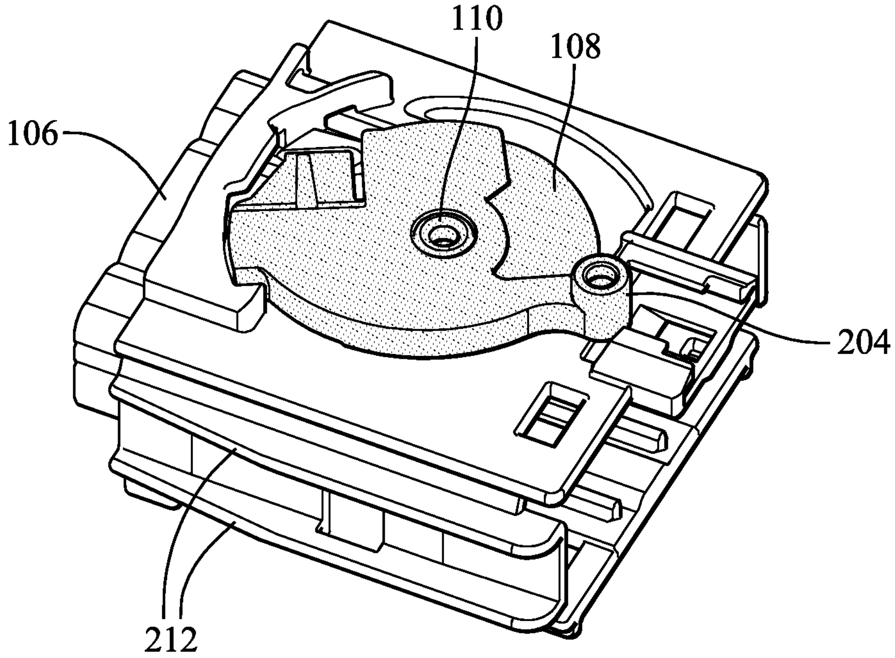
FIG. 6 shows an isometric view of the subassembly of FIG. 5 according to some embodiments.

FIGS. 5 and 6 show top and isometric views respectively of the connector housing 106 and the cam member 108 on the pivot 110 with the engaging lug 204 in a position to be received within the first cam slot 206.

Figure 7:
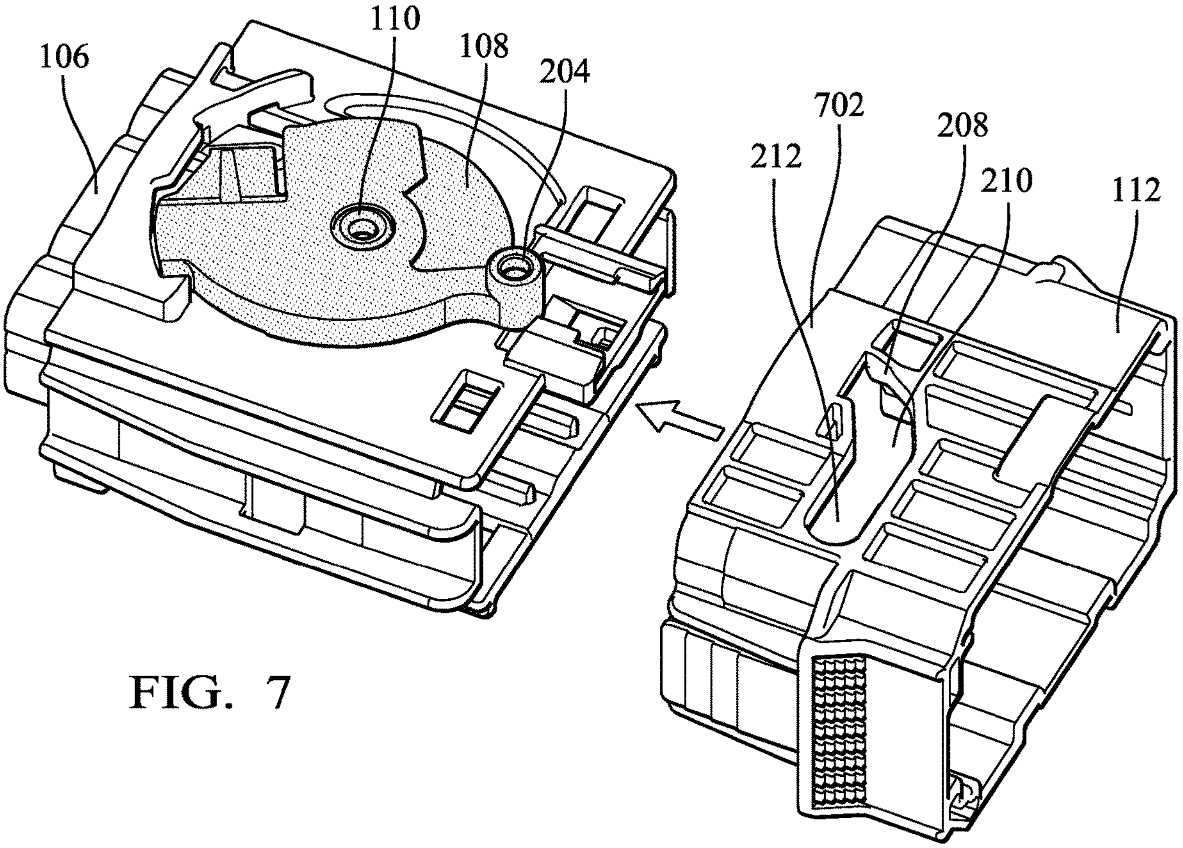
FIG. 7 illustrates a step of attaching a user moveable member to a connector housing of the connector of FIG. 1 according to some embodiments according to some embodiments.
Figure 8:
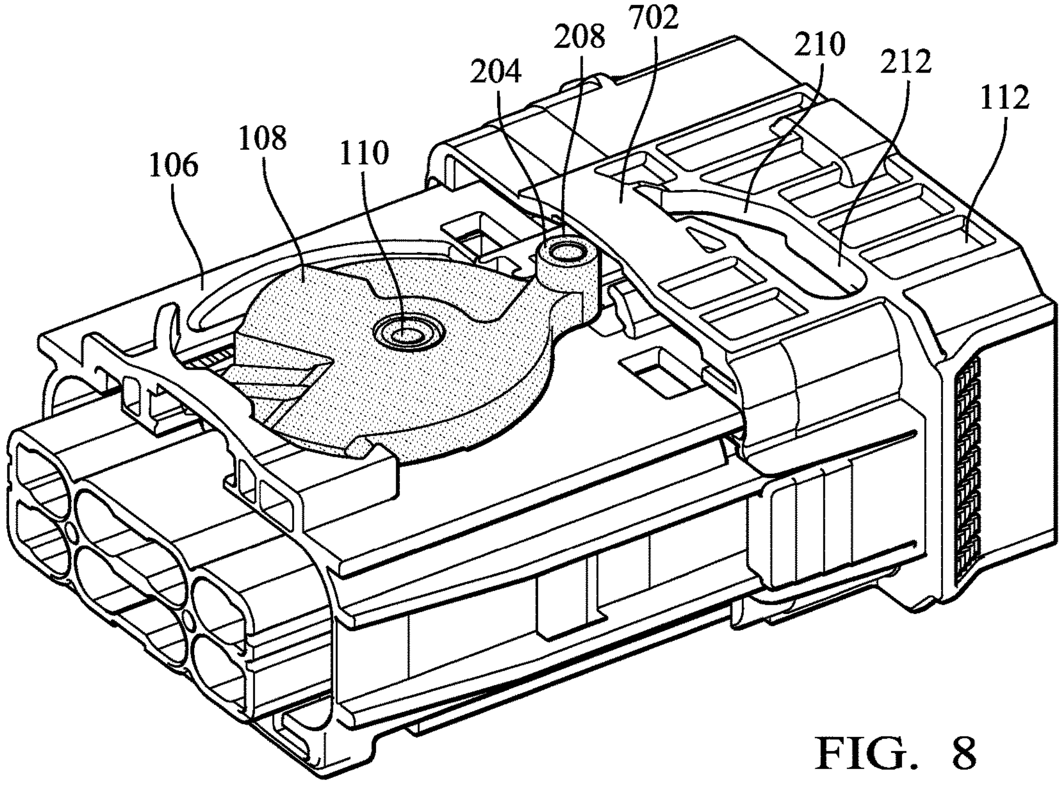
FIG. 8 illustrates an alignment of an opening of a first cam slot in the user moveable member with an engaging lug on the cam member as the user moveable member is attached to the connector housing according to some embodiments.

As shown in FIGS. 7 and 8, the slide 112 is attached to the connector housing 106 and the engaging lug 204 is aligned with and inserted into the entrance portion 208 of the first cam slot 206. In sone embodiments, the slide 112 defines a strap 702 bridging the entrance portion 208 of the first cam slot 206. The strap 702 generally increases the rigidity off the slide 112.

Figure 9:
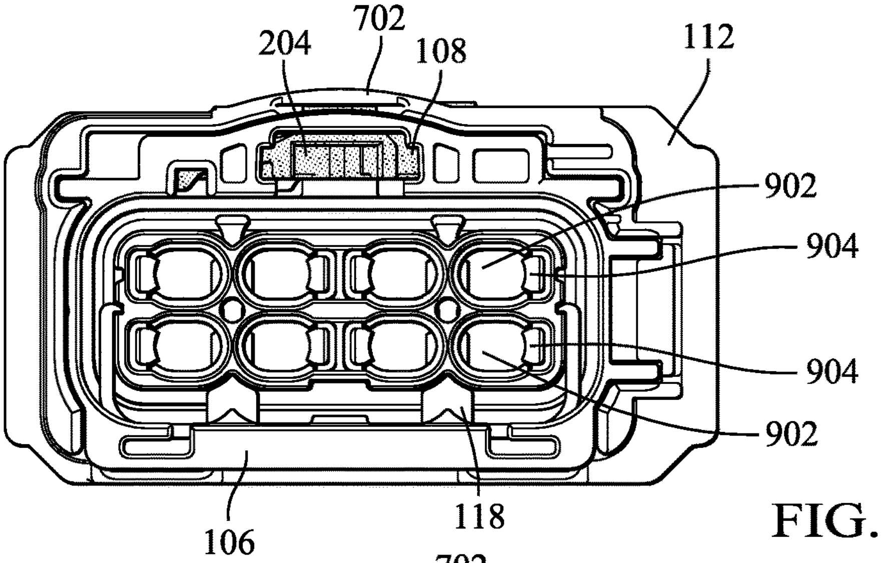
FIG. 9 shows a front view of the connector according to some embodiments.
Figure 10:
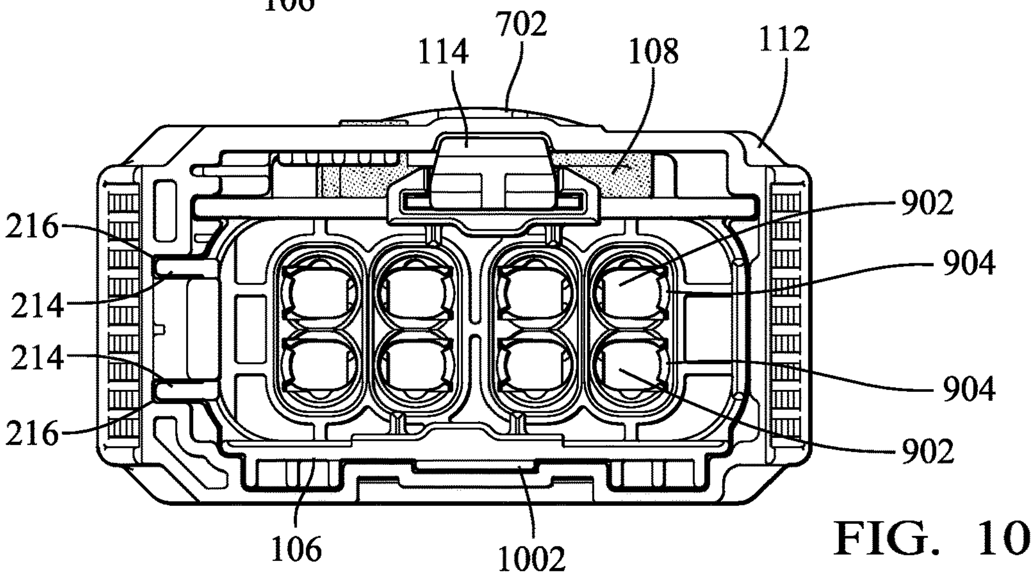
FIG. 10 shows a rear view of the connector according to some embodiments.

FIGS. 9 and 10 show front and rear views respectively of the connector 102. Terminal cavities 902 are defined by the connector housing 106 and hold the electrical terminals are shown in FIGS. 9 and 10. The second connector 104 further includes mating electrical terminals (not shown). The terminal cavities 902 define primary terminal locking features 904 that are configured to retain the electrical terminals in the terminal cavities 902. The secondary terminal locking feature 118 is configured to inhibit flexing of the primary terminal locking features 904 that could cause them to inadvertently release the electrical terminals.

Figure 11:
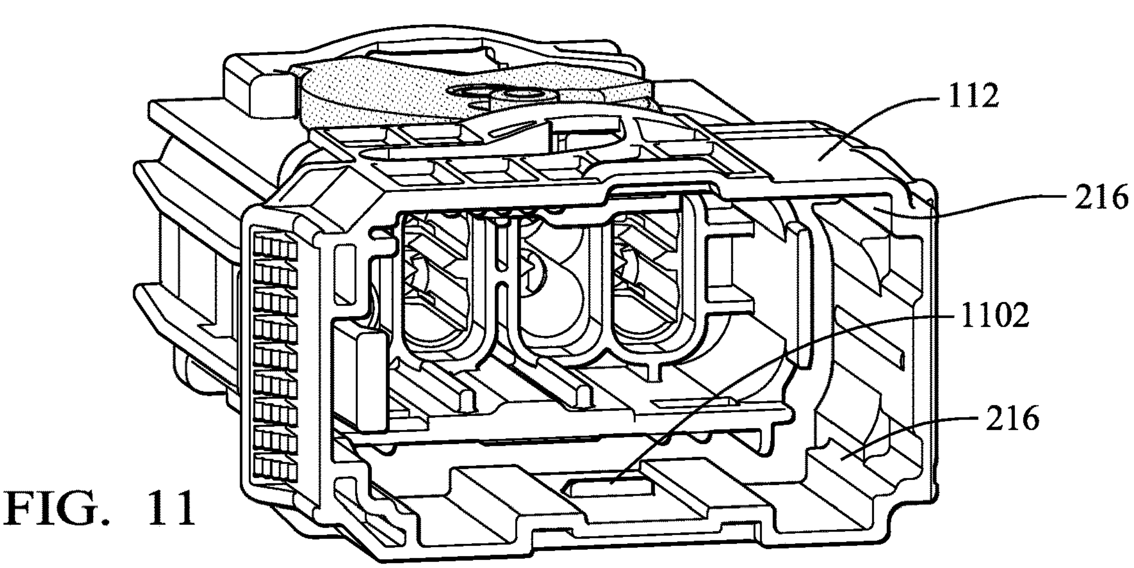
FIG. 11 shows a locking barb that is configured to engage a catch on the connector housing according to some embodiments.

FIG. 11 shows a locking barb 1102 in the slide 112 that is configured to engage a catch 1002 on the connector housing 106 previously shown in FIG. 10. The catch 1002 is configured to engage the barb 1102 in order to retain the slide 112 to the connector housing 106.

Figure 12:
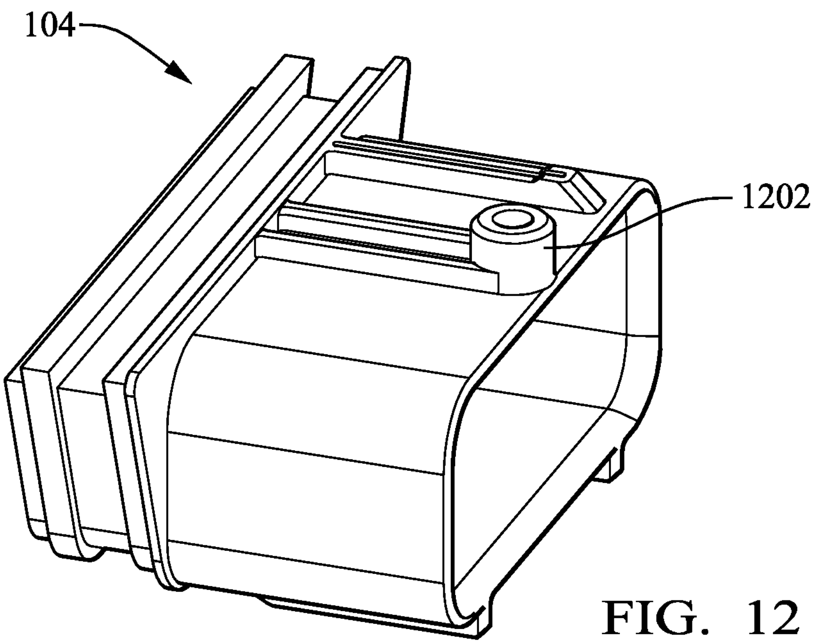
FIG. 12 shows an isometric view of the corresponding mating connector according to some embodiments.

As shown in FIG. 12, the second connector 104 defines a camming post 1202.

Figure 13:
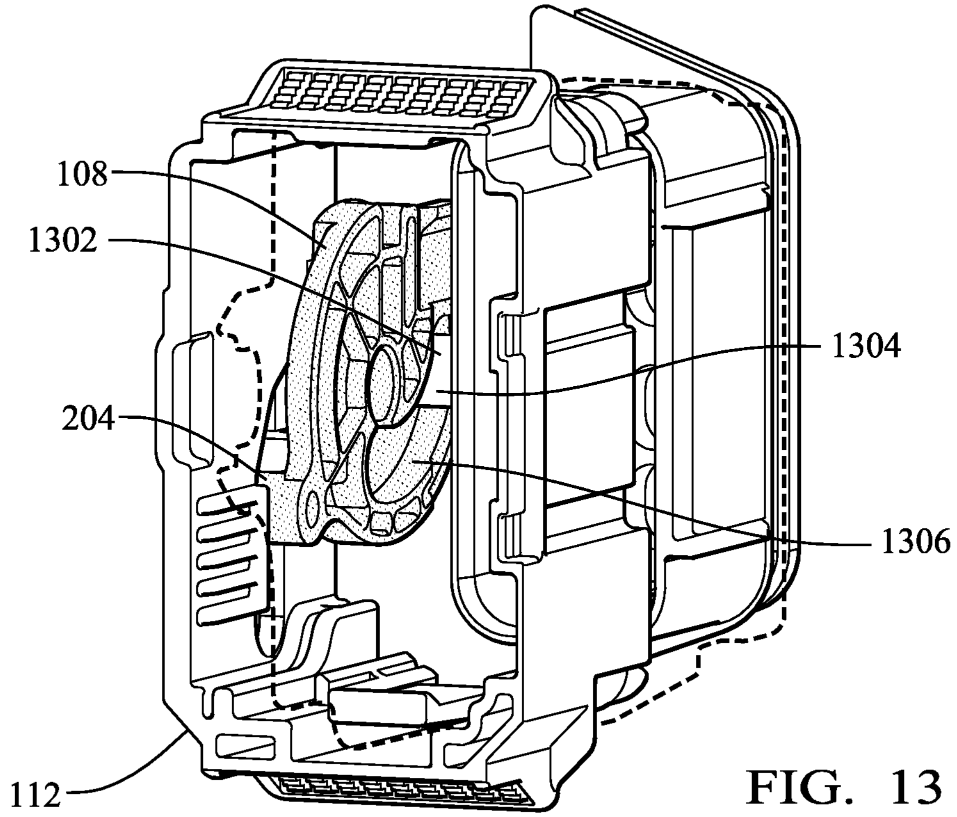
FIG. 13 shows bottom view of a cam member of the connector according to some embodiments according to some embodiments.

The camming post 1202 is received within a second cam slot 1302 in the underside of the cam member 108 shown in FIG. 13. The second cam slot 1302 has a substantially straight entrance portion 1304 and a curved camming portion 1306. As the cam member 108 is rotated by moving the slide 112 forward on the connector housing 106, the camming post moves along the curved camming portion 1306 second cam slot 1302, thereby mating the first and second connector 102, 104 together. Once mated, the first and second connector 102, 104 may be unmated by rotating the cam member 108 in the opposite direction by moving the slide 112 rearward on the connector housing 106.

FIGS. 14 through 17 show a sequence of assembling the slide 112 to the connector housing 106 and operating the first connector 102.

Figure 14:
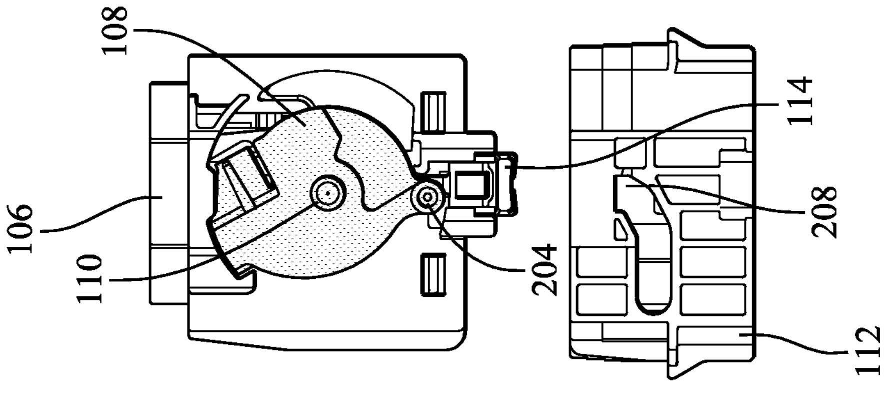
FIGS. 14 through 17 show a sequence of assembling and operating the connector according to some embodiments.

In FIG. 14, the slide 112 and the connector housing 106 are in a preassembled condition. The engaging lug 204 of the cam member 108 is aligned with the entrance portion 208 of the first cam slot 206 in the slide 112.

Figure 15:
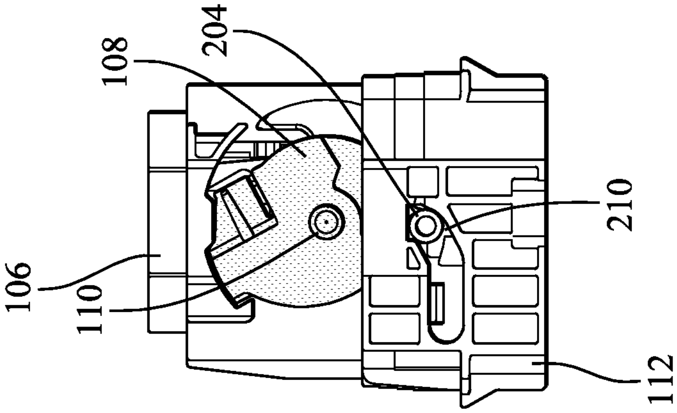

In FIG. 15, the slide 112 is at the beginning of its travel path and the engaging lug 204 of the cam member 108 remains within the entrance portion 208 of the first cam slot 206. At this point the camming post 1202 (see FIG. 12) may be inserted within the entrance portion 1304 (see FIG. 13) of the second cam slot 1302 to connect the first connector 102 with the second connector 104.

Figure 16:
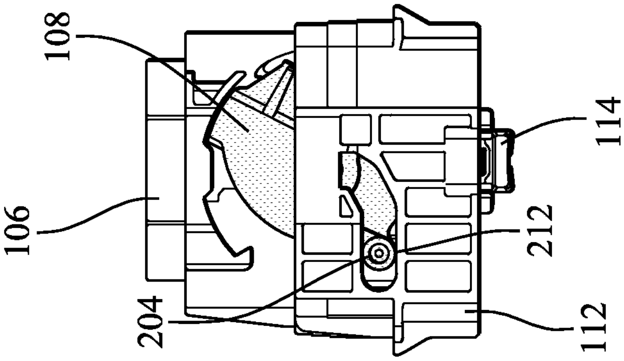

In FIG. 16, the movement of the slide 112 along the X axis causes the engaging lug 204 to move through the entrance portion 208, into the curved camming portion 210, and toward the end portion 212 of the first cam slot 206. The movement of the slide 112 along the X axis also causes the camming post 1202 (see FIG. 12) to move through the entrance portion 1304 (see FIG. 13) and into the curved camming portion 1306 of the second cam slot 1302 (see FIG. 13) on the other side of the cam member 108. This movement will draw the first connector 102 together with the second connector 104. The shape of the curved camming portion 210 of the first cam slot 206 causes the cam member 108 to rotate around the pivot 110 as shown in FIG. 16, thereby further causing the camming post 1202 (see FIG. 12) to move through the curved camming portion 1306 (see FIG. 13) and toward the end of the second cam slot.

Figure 17:
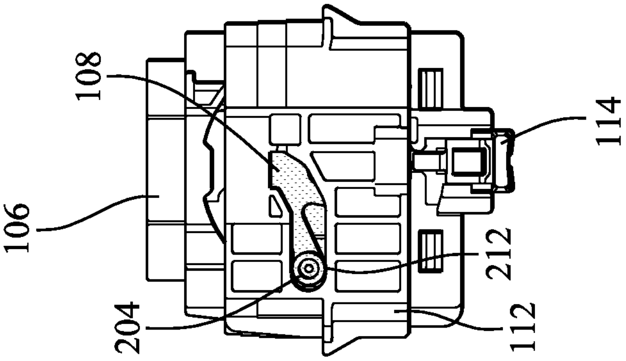

In FIG. 17, the slide 112 is at the end of its travel path and the engaging lug of the cam member 108 is disposed in the end portion 212 of the first cam slot 206. At this stage, the camming post 1202 (see FIG. 12) of the second connector 104 is also disposed within the end of the second cam slot 1302 (see FIG. 13) in the cam member 108, fully mating the first connector 102 with the second connector 104.

The first and second connectors 102, 104 may be separated and disconnected by moving the slide 112 in the opposite direction shown in FIG. 16.

Figure 18:
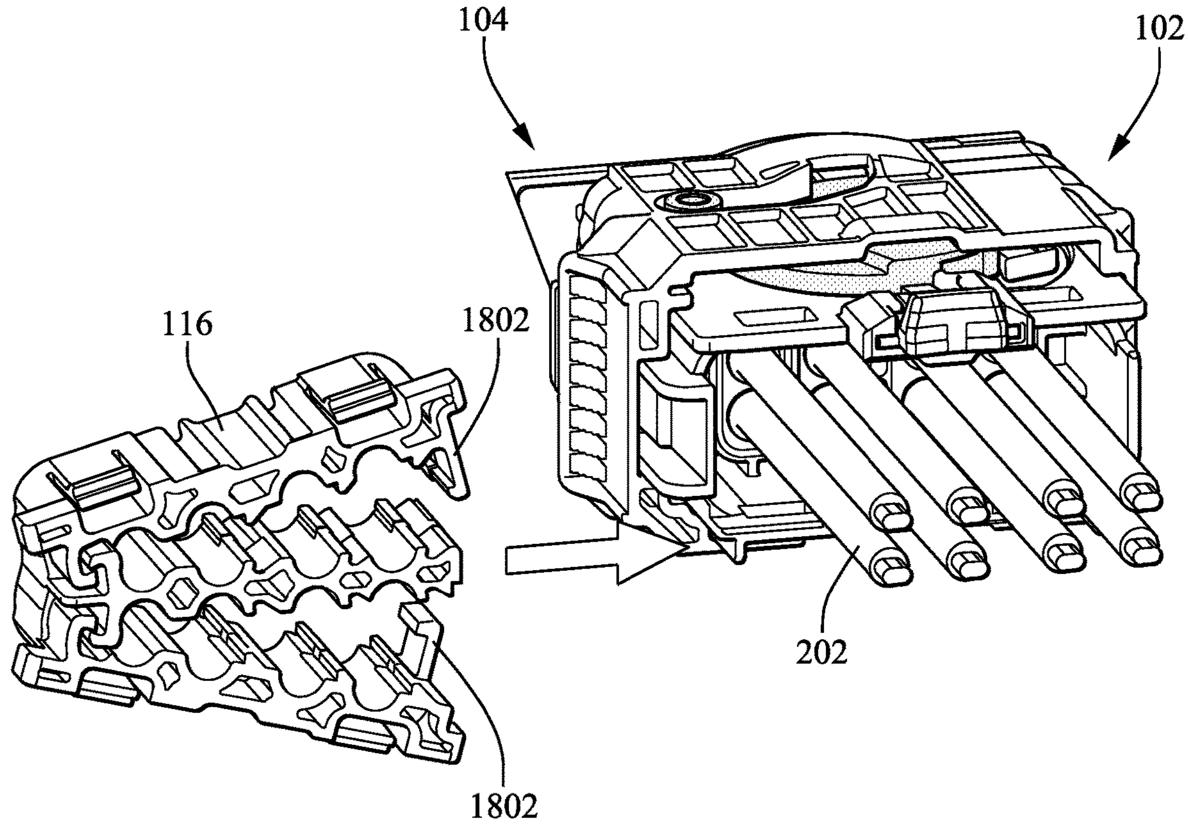
FIGS. 18 through 21 show a sequence in attaching a cable strain relief device to wire cables extending from the connector according to some embodiments.
Figure 19:
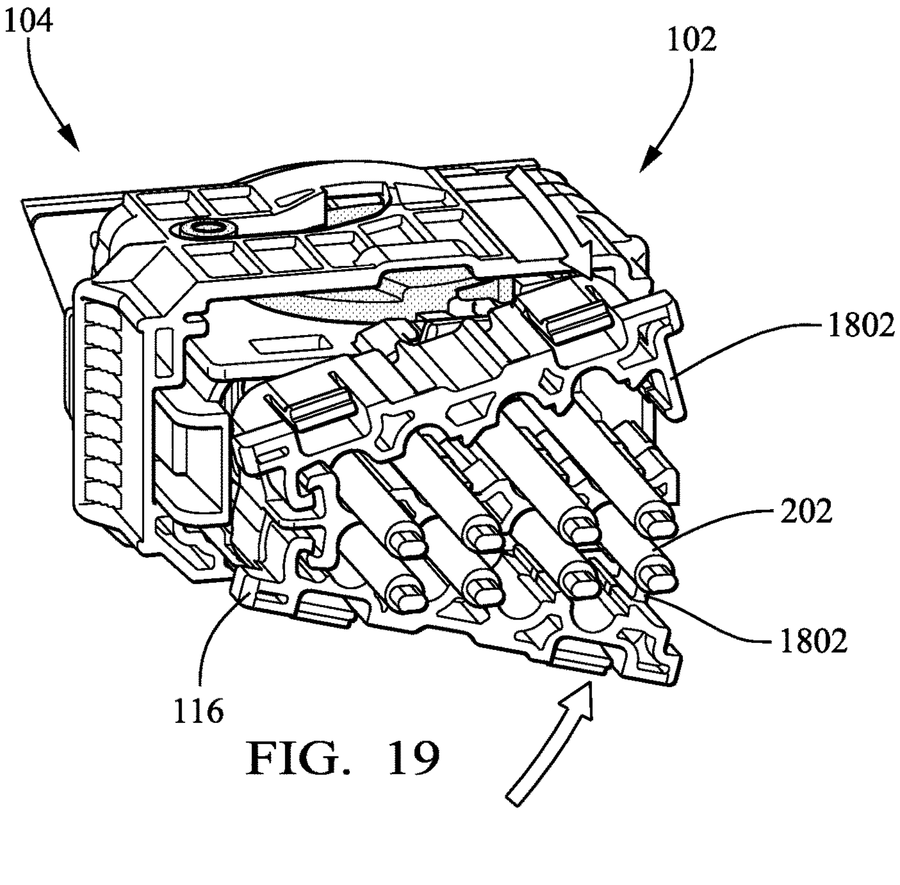
Figure 20:
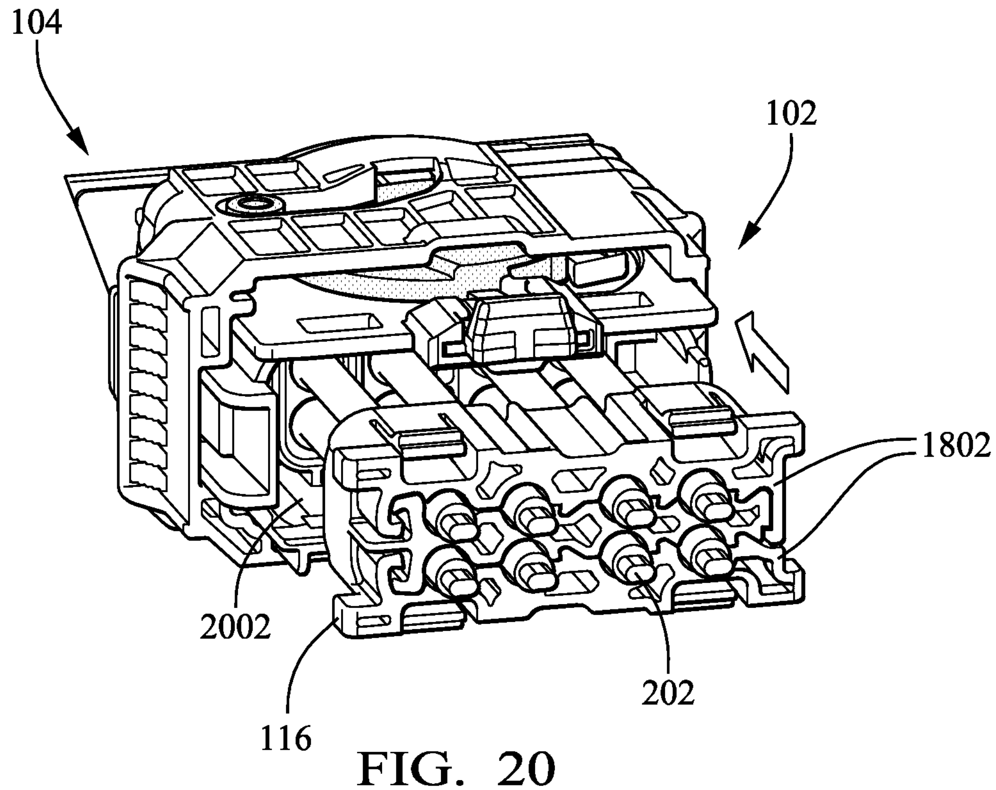
Figure 21:
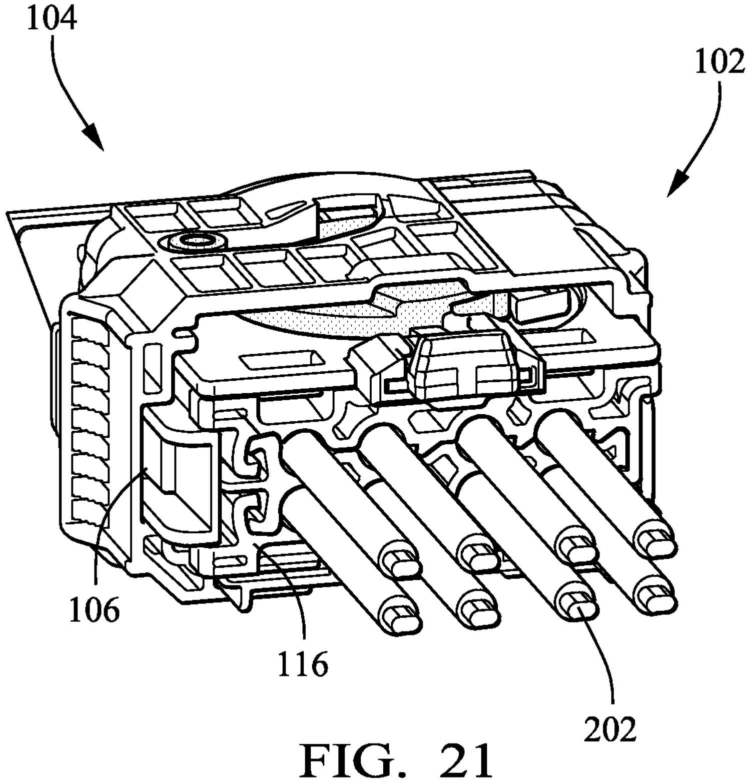

FIGS. 18 through 21 show a sequence of attaching the cable strain relief device 116 over the wire electrical cables 202. In FIG. 18, the latches 1802 of the cable strain relief device 116 are detached, and the cable strain relief device 116 is opened so that it may be placed over the wire electrical cables 202. In FIG. 19, the cable strain relief device 116 is placed over the wire electrical cables 202. In FIG. 20, the cable strain relief device 116 is closed, and the latches 1802 of the cable strain relief device 116 are engaged to secure it to the wire electrical cables 202. In FIG. 21, the cable strain relief device 116 slides along the wire electrical cables 202 and is disposed within a cavity 2002 (see FIG. 20) in the connector housing 106.

Figure 22:
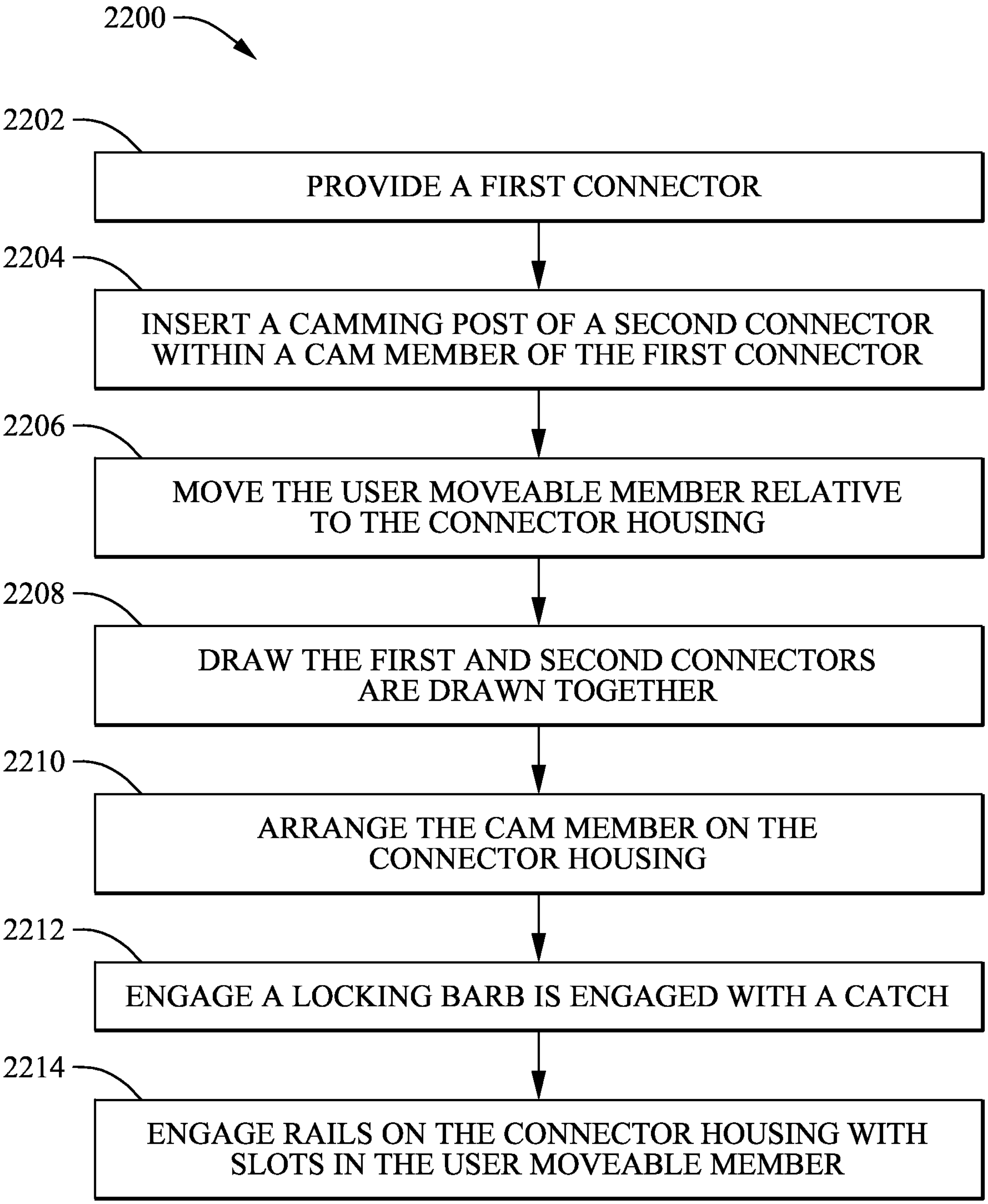
FIG. 22 shows a flow chart of a method of operating a connector system according to some embodiments.

A method 2200 of operating a connector system is shown in FIG. 22. The method 2200 includes the steps of:

At STEP 2202, a first connector is provided. In some embodiments, this step includes providing a first connector 102 having a connector housing 106 and a cam member 108 rotatably attached to the connector housing 106. The cam member defines an engaging lug 204 extending along an axis Z substantially parallel to an axis of rotation R of the cam member 108, and a user moveable member 112, e.g., a slide, slidably attached to the connector housing 106. The user moveable member 112 defines a first cam slot 206 in which the engaging lug 204 is received.

At STEP 2204, a camming post of a second connector is inserted within a cam member of the first connector. In some embodiments, this step includes inserting a camming post 1202 of a second connector 104 within the cam member 108.

At STEP 2206, the user moveable member is moved relative to the connector housing. In some embodiments, this step includes moving the user moveable member 112 relative to the connector housing 106, thereby rotating the cam member 108 by moving the engaging lug 204 along the first cam slot 206.

At STEP 2208, the first and second connectors are drawn together. In some embodiments, this step includes drawing the first and second connectors 102, 104 together by movement of a camming post 1202 of the second connector along a second cam slot 1302 defined by the cam member 108 due to the rotation of the cam member 108.

In some embodiments, the first cam slot 206 may have an entrance portion 208 configured to receive the engaging lug 204, an end portion 212 arranged substantially perpendicularly to the entrance portion 208, and a curved camming portion 210 having one or more radii located between the entrance portion 208 and the end portion 212. In some embodiments, at STEP 2210, the cam member is arranged on the connector housing. In some embodiments, this step includes arranging the cam member 108 on the connector housing 106 such that the engaging lug 204 is in a position to be received within the entrance portion 208 of the first cam slot 206.

In some embodiments, at STEP 2212, a locking barb is engaged with a catch. In some embodiments, this step includes engaging a locking barb 1102 which is defined by the user moveable member 112 with a catch 1002 which is defined by the connector housing 106, thereby retaining the user moveable member 112 to the connector housing 106.

In some embodiments, at STEP 2214, rails on the connector housing engage with slots in the user moveable member. In some embodiments, this step includes engaging rails 214 defined by the connector housing 106 that are inserted within slots 216 in the user moveable member 112 The rails 214 and slots 214 cooperate to cause the user moveable member 112 and the connector housing 106 to slide relative to each other in a substantially straight path along the X axis.

Figure 23:
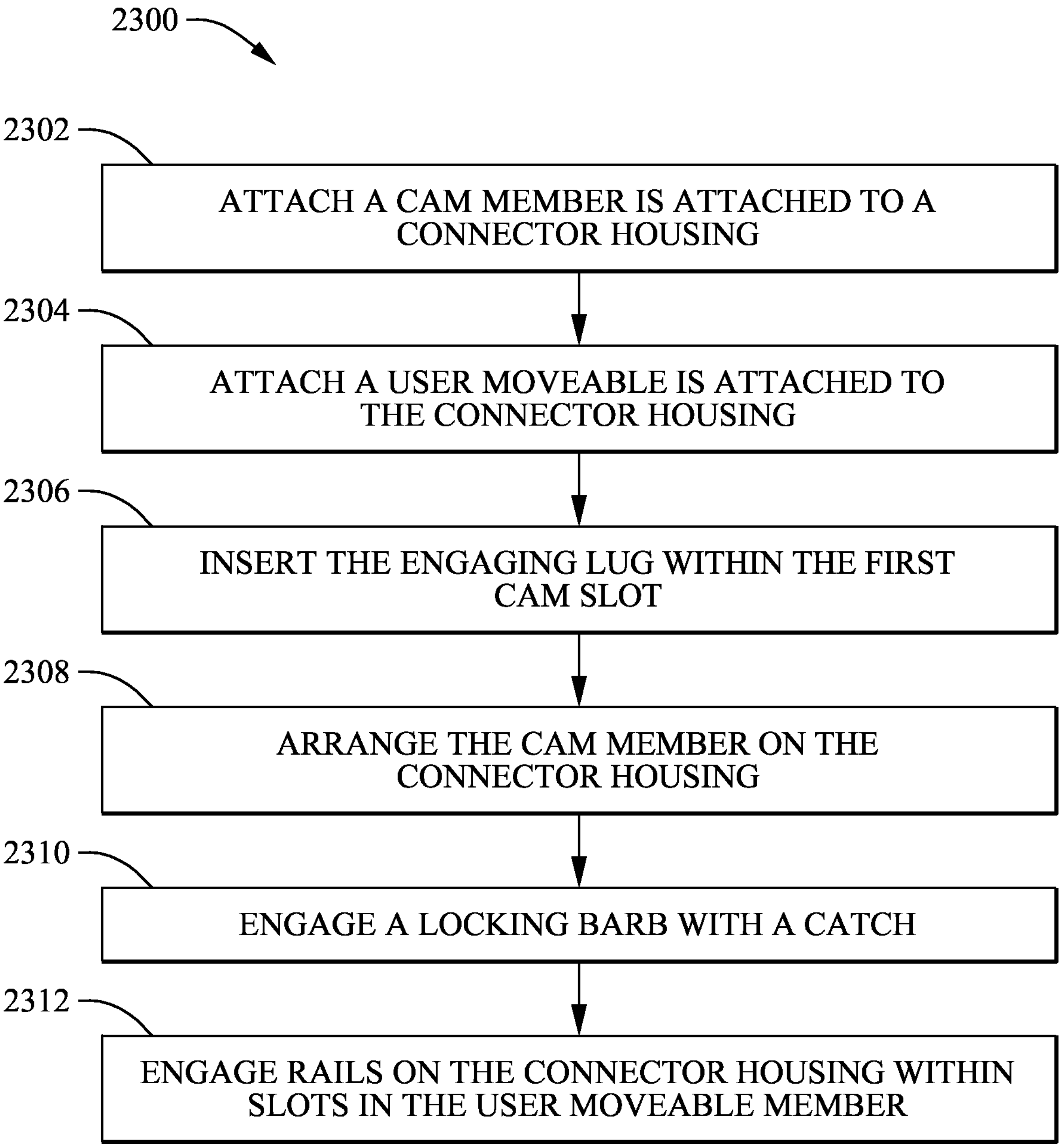
FIG. 23 shows a flow chart of a method of assembling a connector system according to some embodiments.

A method 2300 of assembling a connector system is shown in FIG. 23. The method 2300 includes the steps of:

At STEP 2302, a cam member is attached to a connector housing. In some embodiments, this step includes rotatably attaching a cam member 108 defining an engaging lug 204 to a connector housing 106. The cam member 108 extends along an axis Z substantially parallel to an axis of rotation R of the cam member 108.

At STEP 2304, a user moveable is attached to the connector housing. In some embodiments, this step includes slidably attaching a user moveable member 112 defining a first cam slot 206 to the connector housing 106.

At SETP 2306, the engaging lug is inserted within the first cam slot. In some embodiments, this step includes inserting the engaging lug 204 within the first cam slot 206. The first cam slot 206 is shaped such that the cam member 108 is rotated by movement of the engaging lug 204 through the first cam slot 206 as the user movable member 112 is moved longitudinally along the X axis relative to the connector housing 106.

The first cam slot 206 may have an entrance portion 208 configured to receive the engaging lug 204, an end portion 212 arranged substantially perpendicularly to the entrance portion 208, and a curved camming portion 210 having one or more radii located between the entrance portion 208 and the end portion 212. In some embodiments, at STEP 2308, the cam member is arranged on the connector housing. In some embodiments, this step includes arranging the cam member 108 on the connector housing 106 such that the engaging lug 204 is in a position to be received within the entrance portion 208 of the first cam slot 206.

In some embodiments, at STEP 2310, a locking barb is engaged with a catch. In some embodiments, this step includes engaging a locking barb 1102 which is defined by the user moveable member 112 with a catch 1002 which is defined by the connector housing 106, thereby retaining the user moveable member 112 to the connector housing 106.

In some embodiments, at STEP 2312, rails on the connector housing are engaged within slots in the user moveable member. in some embodiments, this step includes engaging rails 214 defined by the connector housing 106 that are inserted within slots 216 in the user moveable member 112 The rails 214 and slots 214 cooperate to cause the user moveable member 112 and the connector housing 106 to slide relative to each other in a substantially straight path along the X axis.

Discussion of Possible Embodiments

The following are non-exclusive descriptions of possible embodiments of the present invention.

In some aspects, the techniques described herein relate to a connector system, including: a connector having a connector housing; a cam member rotatably attached to the connector housing, wherein the cam member defines an engaging lug extending along an axis substantially parallel to an axis of rotation of the cam member; and a user moveable member slidably attached to the connector housing, wherein the user moveable member defines a first cam slot in which the engaging lug is received and wherein the first cam slot is shaped such that the cam member is rotated by movement of the engaging lug through the first cam slot as the user moveable member is moved longitudinally relative to the connector housing.

The system of the preceding paragraph can optionally include, additionally and/or alternatively any, one or more of the following features, configurations and/or additional components.

In some aspects, the techniques described herein relate to a connector system, wherein the connector is a first connector, wherein the connector system further includes a second connector configured to mate with the first connector, and wherein the cam member has a second cam slot configured to contact a camming post of the second connector and draw the first and second connectors together due to a rotation of the cam member.

In some aspects, the techniques described herein relate to a connector system, wherein the first connector further includes electrical terminals disposed within cavities defined by the connector housing and wherein the second connector further includes mating electrical terminals.

In some aspects, the techniques described herein relate to a connector system, wherein the cavities define primary locking features configured to retain the electrical terminals in the cavities and wherein the connector system further includes a secondary locking feature configured to inhibit the primary locking features from inadvertently releasing the electrical terminals.

In some aspects, the techniques described herein relate to a connector system, further including a cable strain relief device configured to snap over wire electrical cables attached to the electrical terminals and be disposed within a retainer cavity in the connector housing.

In some aspects, the techniques described herein relate to a connector system, wherein the second cam slot is curved along its length and wherein the camming post is a camming post defined by the second connector.

In some aspects, the techniques described herein relate to a connector system, wherein the first cam slot has a substantially straight entrance portion configured to receive the engaging lug, a substantially straight end portion arranged substantially perpendicularly to the entrance portion, and a curved camming portion having one or more radii located between the entrance portion and the end portion.

In some aspects, the techniques described herein relate to a connector system, wherein the cam member may be arranged on the connector housing such that the engaging lug is in a position to be received within the entrance portion of the first cam slot.

In some aspects, the techniques described herein relate to a connector system, wherein the user moveable member defines a strap bridging the entrance portion of the first cam slot.

In some aspects, the techniques described herein relate to a connector system, wherein the user moveable member defines a locking barb which is configured to engage a catch which is defined by the connector housing, thereby retaining the user moveable member to the connector housing.

In some aspects, the techniques described herein relate to a connector system, wherein the connector housing defines rails that are received within slots in the user moveable member which are configured to cooperate to cause the user moveable member and the connector housing to slide relative to each other in a substantially straight path.

In some aspects, the techniques described herein relate to a method of operating a connector system, including: providing a first connector having a connector housing and a cam member rotatably attached to the connector housing, wherein the cam member defines an engaging lug extending along an axis substantially parallel to an axis of rotation of the cam member, and a user moveable member slidably attached to the connector housing, wherein the user moveable member defines a first cam slot in which the engaging lug is received; inserting a camming post of a second connector within the cam member; moving the user moveable member relative to the connector housing, thereby rotating the cam member by moving the engaging lug along the first cam slot; and drawing the first and second connectors together by movement of a camming post of the second connector along a second cam slot defined by the cam member due to the rotation of the cam member.

The method of the preceding paragraph can optionally include, additionally and/or alternatively any, one or more of the following features, configurations and/or additional components.

In some aspects, the techniques described herein relate to a method, wherein the first cam slot has a substantially straight entrance portion configured to receive the engaging lug, a substantially straight end portion arranged substantially perpendicularly to the entrance portion, and a curved camming portion having one or more radii located between the entrance portion and the end portion and wherein the method further includes arranging the cam member on the connector housing such that the engaging lug is in a position to be received within the entrance portion of the first cam slot.

In some aspects, the techniques described herein relate to a method, wherein the method further includes engaging a locking barb which is defined by the user moveable member with a catch which is defined by the connector housing, thereby retaining the user moveable member to the connector housing.

In some aspects, the techniques described herein relate to a method, wherein the second cam slot is curved along its length and wherein the camming post is a camming post defined by the second connector.

In some aspects, the techniques described herein relate to a method, wherein the method further includes engaging rails defined by the connector housing within slots in the user moveable member which are configured to cooperate to cause the user moveable member and the connector housing to slide relative to each other in a substantially straight path.

In some aspects, the techniques described herein relate to a method of assembling a connector system, including: rotatably attaching a cam member defining an engaging lug to a connector housing, wherein the engaging post extends along an axis substantially parallel to an axis of rotation of the cam member; slidably attaching a user moveable member defining a first cam slot to the connector housing; and inserting the engaging lug within the first cam slot, wherein the first cam slot is shaped such that the cam member is rotated by movement of the engaging lug through the first cam slot as the user moveable member is moved longitudinally relative to the connector housing.

The method of the preceding paragraph can optionally include, additionally and/or alternatively any, one or more of the following features, configurations and/or additional components.

In some aspects, the techniques described herein relate to a method, wherein the first cam slot has a substantially straight entrance portion configured to receive the engaging lug, a substantially straight end portion arranged substantially perpendicularly to the entrance portion, and a curved camming portion having one or more radii located between the entrance portion and the end portion and wherein the method further includes arranging the cam member on the connector housing such that the engaging lug is in a position to be received within the entrance portion of the first cam slot.

In some aspects, the techniques described herein relate to a method, wherein the method further includes engaging a locking barb which is defined by the user moveable member with a catch which is defined by the connector housing, thereby retaining the user moveable member to the connector housing.

In some aspects, the techniques described herein relate to a method, wherein the method further includes engaging rails defined by the connector housing within slots in the user moveable member which are configured to cooperate to cause the user moveable member and the connector housing to slide relative to each other in a substantially straight path.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A connector system, comprising:

a connector having a connector housing;

a cam member rotatably attached to the connector housing, wherein the cam member defines an engaging lug extending along an axis substantially parallel to an axis of rotation of the cam member; and a user moveable member slidably attached to the connector housing, wherein the user moveable member defines a first cam slot in which the engaging lug is received and wherein the first cam slot is shaped such that the cam member is rotated by movement of the engaging lug through the first cam slot as the user moveable member is moved longitudinally relative to the connector housing, wherein the first cam slot has a substantially straight entrance portion configured to receive the engaging lug, and wherein a portion of the user moveable member extends across the entrance portion of the cam slot.

2. The connector system according to claim 1, wherein the user moveable member defines a locking barb which is configured to engage a catch which is defined by the connector housing, thereby retaining the user moveable member to the connector housing.

3. The connector system according to claim 1, wherein the connector housing defines rails that are received within slots in the user moveable member which are configured to cooperate to cause the user moveable member and the connector housing to slide relative to each other in a substantially straight path.

4. The connector system according to claim 1, wherein the connector is a first connector, wherein the connector system further comprises a second connector configured to mate with the first connector, and wherein the cam member has a second cam slot configured to contact a camming post of the second connector and draw the first and second connectors together due to a rotation of the cam member.

5. The connector system according to claim 4, wherein the first connector further comprises electrical terminals disposed within cavities defined by the connector housing and wherein the second connector further comprises mating electrical terminals.

6. The connector system according to claim 5, wherein the cavities define primary locking features configured to retain the electrical terminals in the cavities and wherein the connector system further comprises a secondary locking feature configured to inhibit the primary locking features from inadvertently releasing the electrical terminals.

7. The connector system according to claim 5, further comprising a cable strain relief device configured to snap over wire electrical cables attached to the electrical terminals and be disposed within a retainer cavity in the connector housing.

8. The connector system according to claim 1, wherein the first cam slot has a substantially straight end portion arranged substantially perpendicularly to the entrance portion and a curved camming portion having one or more radii located between the entrance portion and the end portion.

9. The connector system according to claim 8, wherein the cam member may be arranged on the connector housing such that the engaging lug is in a position to be received within the entrance portion of the first cam slot.

10. The connector system according to claim 8, wherein the portion of the user moveable member extending across the entrance portion of the cam slot comprises a strap.

11. A method of operating a connector system, comprising:

providing a first connector having a connector housing and a cam member rotatably attached to the connector housing, wherein the cam member defines an engaging lug extending along an axis substantially parallel to an axis of rotation of the cam member, and a user moveable member slidably attached to the connector housing, wherein the user moveable member defines a first cam slot in which the engaging lug is received, wherein the first cam slot has a substantially straight entrance portion configured to receive the engaging lug, a substantially straight end portion arranged substantially perpendicularly to the entrance portion, and a curved camming portion having one or more radii located between the entrance portion and the end portion;

arranging the cam member on the connector housing such that the engaging lug is in a position to be received within the entrance portion of the first cam slot;

inserting a camming post of a second connector within the cam member;

moving the user moveable member relative to the connector housing, thereby rotating the cam member by moving the engaging lug along the first cam slot; and drawing the first and second connectors together by movement of a camming post of the second connector along a second cam slot defined by the cam member due to the rotation of the cam member.

12. The method according to claim 11, wherein the method further comprises engaging a locking barb which is defined by the user moveable member with a catch which is defined by the connector housing, thereby retaining the user moveable member to the connector housing.

13. The method according to claim 11, wherein the method further comprises engaging rails defined by the connector housing within slots in the user moveable member which are configured to cooperate to cause the user moveable member and the connector housing to slide relative to each other in a substantially straight path.

14. A method of assembling a connector system, comprising:

rotatably attaching a cam member defining an engaging lug to a connector housing, wherein the engaging lug extends along an axis substantially parallel to an axis of rotation of the cam member;

slidably attaching a user moveable member defining a first cam slot to the connector housing;

inserting the engaging lug within the first cam slot, wherein the first cam slot is shaped such that the cam member is rotated by movement of the engaging lug through the first cam slot as the user moveable member is moved longitudinally relative to the connector housing;

attaching a cable strain relief device over wire electrical cables attached to electrical terminals disposed within cavities defined by the connector housing; and disposing the cable strain relief device within a retainer cavity in the connector housing.

15. The method according to claim 14, wherein the first cam slot has a substantially straight entrance portion configured to receive the engaging lug, a substantially straight end portion arranged substantially perpendicularly to the entrance portion, and a curved camming portion having one or more radii located between the entrance portion and the end portion and wherein the method further comprises arranging the cam member on the connector housing such that the engaging lug is in a position to be received within the entrance portion of the first cam slot.

16. The method according to claim 14, wherein the method further comprises engaging a locking barb which is defined by the user moveable member with a catch which is defined by the connector housing, thereby retaining the user moveable member to the connector housing.

17. The method according to claim 14, wherein the method further comprises engaging rails defined by the connector housing within slots in the user moveable member which are configured to cooperate to cause the user moveable member and the connector housing to slide relative to each other in a substantially straight path.

* * * * *